United States Patent
Park et al.

(10) Patent No.: US 7,230,985 B2
(45) Date of Patent: Jun. 12, 2007

(54) LOOK-AHEAD DECISION FEEDBACK EQUALIZING RECEIVER

(75) Inventors: Hong-June Park, Kyungsangbuk-do (KR); Young-Soo Sohn, Seoul (KR)

(73) Assignee: Postech Foundation, Kyungsangbuk-do (KR)

( * ) Notice: Subject to any disclaimer, the term of this patent is extended or adjusted under 35 U.S.C. 154(b) by 707 days.

(21) Appl. No.: 10/667,658

(22) Filed: Sep. 23, 2003

(65) Prior Publication Data

US 2004/0076228 A1  Apr. 22, 2004

(30) Foreign Application Priority Data

Oct. 16, 2002  (KR)  .................... 10-2002-0063139

(51) Int. Cl.
*H03K 5/159* (2006.01)
(52) U.S. Cl. ................ 375/233; 375/229; 326/93; 326/94; 326/95; 326/96
(58) Field of Classification Search ........... 375/233, 375/229; 326/93–96
See application file for complete search history.

(56) References Cited

U.S. PATENT DOCUMENTS

| | | | | |
|---|---|---|---|---|
| 4,972,430 A * | 11/1990 | Cantwell | ................. | 375/130 |
| 5,844,436 A * | 12/1998 | Altmann | ................. | 327/156 |
| 6,396,329 B1 * | 5/2002 | Zerbe | ................. | 327/336 |
| 2003/0195645 A1 * | 10/2003 | Pillay et al. | ................. | 700/94 |
| 2004/0001567 A1 * | 1/2004 | Wei | ................. | 375/371 |

\* cited by examiner

*Primary Examiner*—Mohammed Ghayour
*Assistant Examiner*—Leila Malek
(74) *Attorney, Agent, or Firm*—Bacon & Thomas, PLLC

(57) ABSTRACT

A look-ahead decision feedback equalizing receiver includes an equalizing block for amplifying a high-frequency component of an external data signal fed thereto in response to a first and a second input signal, to provide a first and a second equalized external data signal; a clock synthesizer for outputting sampling clocks, a timing thereof being adjusted by receiving an external clock synchronized with the external data signal; an over-sampler for over-sampling the first and the second equalized external data signal in synchronization with the sampling clocks. A MUX block for multiplexing the outputs of the over-sampler in response to outputs of the MUX block, to thereby attain decision results; and a phase detector for deciding the timing of the sampling clock by analyzing the decision results.

9 Claims, 6 Drawing Sheets

LOOK-AHEAD DECISION FEEDBACK EQUALIZING RECEIVER

FIELD OF THE INVENTION

The present invention relates to an I/O interface for use in communications between an SDRAM (synchronous dynamic random access memory) and a controller or between digital chips; and, more particularly, to an equalizing receiver which employs a look-ahead decision feedback equalizing technology.

BACKGROUND OF THE INVENTION

The amount of data transmission as well as transmission rate of the data in communications between a DRAM (dynamic random access memory) and a CPU(central processing unit) or between digital chips such as ASICs(application specific integrated circuits) continue to rise.

However, in such communications, the data transmission rate is limited by time jitter occurring in a PLL(phase locked loop)/DLL(delay locked loop) circuit, an offset due to dimensional deviations in the process of producing transmitters and receivers and so on. Also a setup/hold time of a receiver circuit is not long enough, due to a reduction in a data size margin and a time margin resulting from an inter-symbol interference (ISI) between signals. In such a case, the ISI is generated due to attenuation in high frequency components of signals in a transmission channel. Moreover, a time skew is generated, due to a difference in time required for transmitting a signal through a channel, between signals or between a clock and the signal.

In the meantime, in order to transmit a signal at a high speed by overcoming a bandwidth limitation given in transmission channels of a bus structure where a plurality of chips are interconnected through one conductive line, technologies for amplifying a high-frequency component of a signal in a transmitter or in a receiver have been developed.

The conventional technology for amplifying a high-frequency component of a signal in the transmitter is referred to as a pre-emphasis scheme, a structure thereof being shown in FIG. 1. As shown in FIG. 1, the operation of the transmitter can be represented as $$H(z)=1-a\cdot z^{-1},$$

so that it can serve as a high pass filter(HPF), wherein 'a' represents a constant and 'z' means a variable complex number. The pre-emphasis scheme has usually been applied to current mode signaling circuits. However, since a SSTL (series stub terminated logic) channel for a DRAM interface employs a full-swing voltage-mode driving technique at a transmitter output, it is difficult to use the pre-emphasis scheme for the SSTL channel.

The conventional technologies for amplifying a high-frequency component of a signal in the receiver are indicated in FIGS. 2 and 3. The operation of the receiver in FIG. 2, i.e, a linear feed-forward scheme, can be represented by $$H(z)=1-a\cdot z^{-1},$$

wherein 'a' represents a constant and 'z' means a variable complex number. In the linear feed-forward scheme, a capacitor is required to store an input analog signal. In this way, noise immunity of the receiver may be degraded due to the analog nature of the signal and an equalization circuit cannot be simplified due to the presence of analog storage circuits, e.g., capacitors.

Meanwhile, the operation of the receiver in FIG. 3, which is called as a decision feedback equalization(DFE) scheme, can be represented by $$Y[n]=x[n]-a\cdot\hat{Y}[n-1],$$

wherein 'n' is a positive integer, x[n] represents a current external data signal fed to an equalizing amplifier, $\hat{Y}[n-1]$ indicates a preceding decision result, 'a' means a constant and Y[n] shows an output voltage of the equalizing amplifier. In the DFE scheme, after it is determined whether a preceding external data signal x[n−1] is H(High) or L(Low), a fraction of the preceding decision result, $a\cdot\hat{Y}[n-1]$, is fed back to amplify a high-frequency component of the current external data signal. In contrast to the above-mentioned linear analog feed-forward scheme, high noise immunity is achieved in the DFE scheme because of the digital nature of the feedback signal $a\cdot\hat{Y}[n-1]$ and an equalization circuit employing the DFE scheme may be much simplified owing to the absence of analog storage circuits.

However, the DFE scheme has a limitation in a high-speed transmission due to a delay time at its feedback path. Furthermore, due to a difference in time required for transmitting signals through channels, there is a time skew between transmitted signals or between a clock and a transmitted signal. The skew has an adverse effect on signal transmission at a high speed. For the normal operation of an input circuit in a receiver, a setup/hold time should be sufficient as needed, but the time skew makes it difficult.

To solve the above-mentioned problems in the DFE scheme, the determination of suitable timing of a clock is required. For example, in the prior art, a proper sampling time is attained by over-sampling a transmitted signal (i.e., data are sampled twice or more per one period of the signal) for each data pin of a receiver. That is, in a 2× over-sampling scheme as shown in FIG. 4, the data of the signal are sampled three times in two periods of the signal, and if first two samples have a same value, the delay in the sampling clock may increase. On the other hand, if last two samples have a same value, the delay time of the sampling clock can be reduced. Through such a feedback procedure, a clock with a suitable delay (the timing of a sampling clock is determined to be in the middle of a specific portion of a stream of the data) is provided for each pin of the receiver.

In determining the suitable timing of a clock by using the 2× over-sampling scheme, a signal with minimal attenuation in time scale should be used. That is, if a high-frequency component of the signal is considerably attenuated while passing through a transmission channel, the time uncertainty region of data is broadened, and the scheme for determining the suitability of the clock by using the over-sampling becomes ineffective due to an increase in time jitter. Thus, the 2× over-sampling scheme cannot be used in a channel where a high-frequency component of a signal is seriously attenuated.

In transmitting a signal in the above-mentioned digital system, therefore, there may occur various problems as further explained below.

First, when a signal is transmitted at a high speed in a channel of the digital system, a high frequency component of the signal may be attenuated. Such a phenomenon causes an ISI between signals and reduces a time margin and a voltage margin of the signal, thereby making it difficult to carry out data transmission at a high speed.

Secondly, in the prior art, in order to avoid such a phenomenon, an equalizing technology is applied to either a terminal of a transmitter or that of a receiver, so that the attenuated component is compensated. However, the equalizing technology applied to the terminal of the transmitter is not applicable to a DRAM or an ASIC where a voltage at the terminal of the transmitter has a waveform of a full swing. Further, the equalizing technology applied to the terminal of the receiver has drawbacks such as low noise immunity and low-speed of data transmission.

Thirdly, when a clock signal is transmitted with a data signal from a transmitter to a receiver, a time skew is generated due to a difference in the delay time required for signals to pass through a transmission channel, which may in turn reduce the time margin of the data signal.

Fourthly, in order to solve the time skew problem, an over-sampling scheme is employed to find a suitable clock timing. However, in the occurrence of an attenuation of a signal, it is very difficult to apply such a scheme to a broadened time uncertainty region of the data signal.

SUMMARY OF THE INVENTION

It is, therefore, a primary object of the present invention to provide an equalizing receiver, which adopts a look-ahead decision feedback equalizing scheme, for compensating an attenuation of a high-frequency component of a signal and further over-sampling the compensated signal so that a skew between data and a clock is compensated, thereby facilitating a high speed data transmission.

In accordance with the present invention, there is provided a look-ahead decision feedback equalizing receiver including: an equalizing block for amplifying a high-frequency component of an external data signal fed thereto in response to a predetermined first input signal and a predetermined second input signal, to provide a first equalized external data signal and a second equalized external data signal, respectively; a clock synthesizer for outputting a plurality of sampling clocks, a timing thereof being adjusted by receiving an external clock synchronized with the external data signal; an over-sampler for over-sampling the first equalized external data signal and the second equalized external data signal in synchronization with the sampling clocks; a MUX block for multiplexing the outputs of the over-sampler in response to preceding outputs of the MUX block, which serve as select signals for the MUX block, to thereby attain MUX decision results; and a phase detector for deciding the timing of the sampling clocks by analyzing the MUX decision results.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 5:
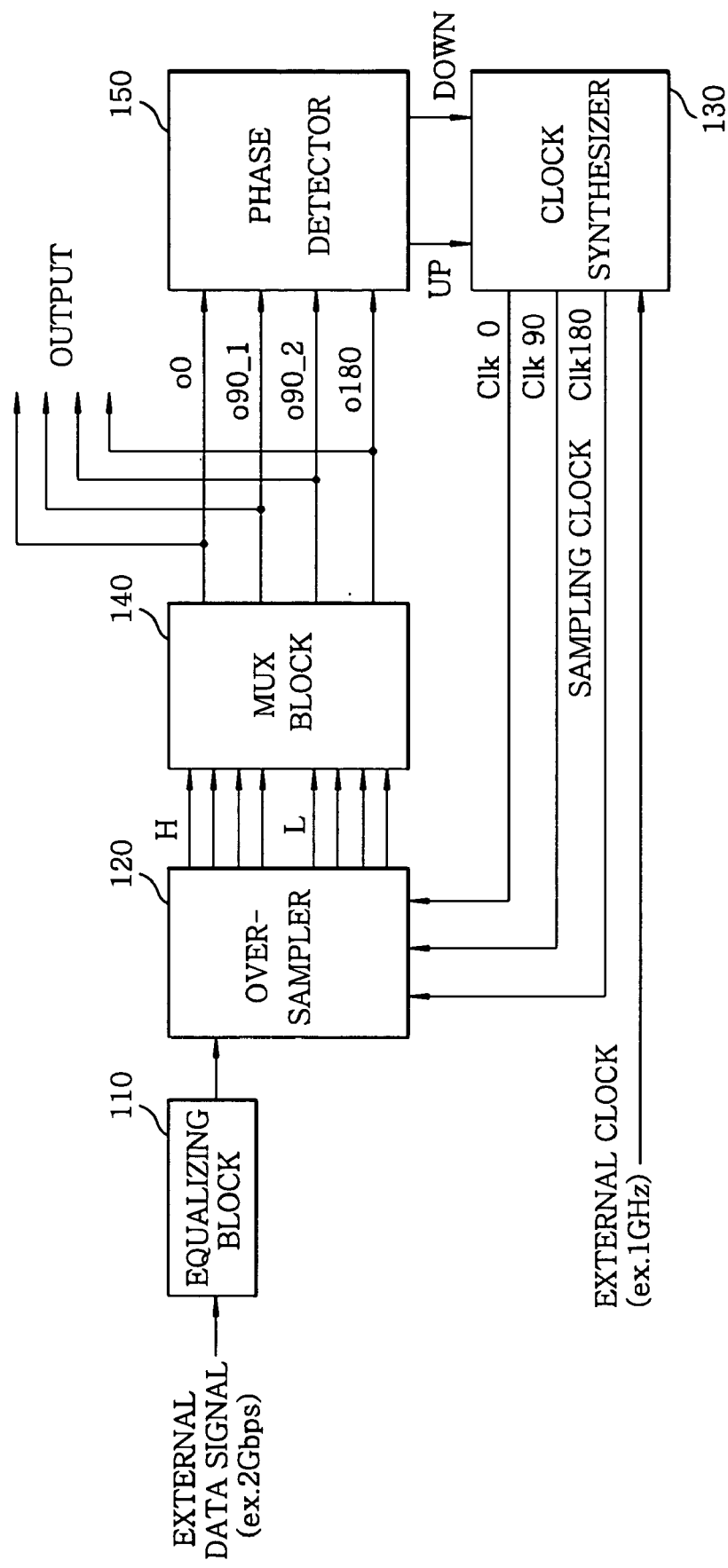
FIG. 5 provides a block diagram of a receiver in accordance with a preferred embodiment of the present invention.

FIG. 5 is a block diagram illustrating a CMOS (complementary metal oxide semiconductor) receiver using a look-ahead decision feedback equalizing scheme in accordance with a preferred embodiment of the present invention. An external data signal with an attenuated high-frequency component is fed to an equalizing block 110 and an external clock signal synchronized with the external data signal is fed to a clock synthesizer 130. Herein, in case a DDR (double data rate) technology is applied to the receiver, the data transmission rates of the external data signal and the external clock signal are 2 Gbps and 1 GHz, respectively.

Figure 1:
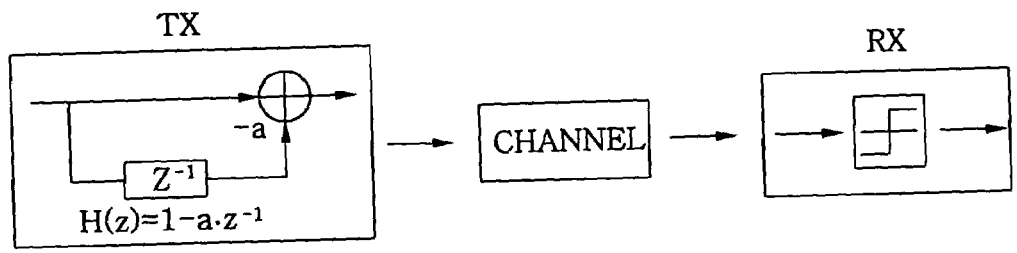
FIG. 1 shows a conventional principle of an equalizing scheme employed in a transmitter.
Figure 2:
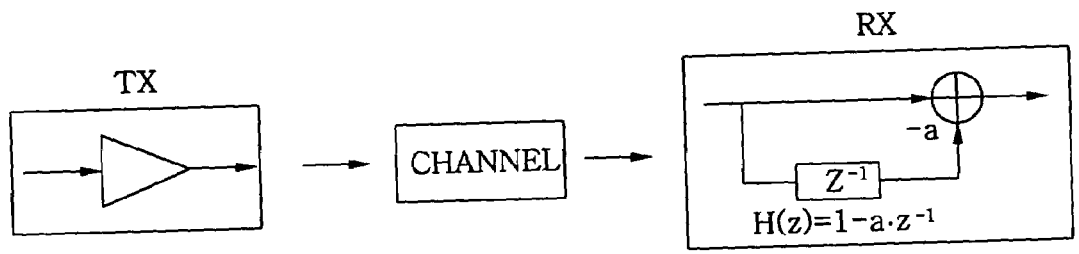
FIG. 2 describes a conventional principle of an equalizing scheme employed in a receiver, which has no feedback loop.
Figure 3:
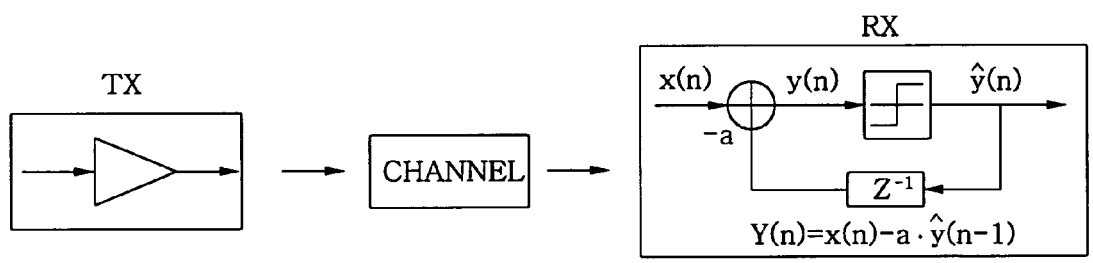
FIG. 3 illustrates a conventional principle of an equalizing scheme employed in a receiver, which has a decision feedback circuit therein.
Figure 4:
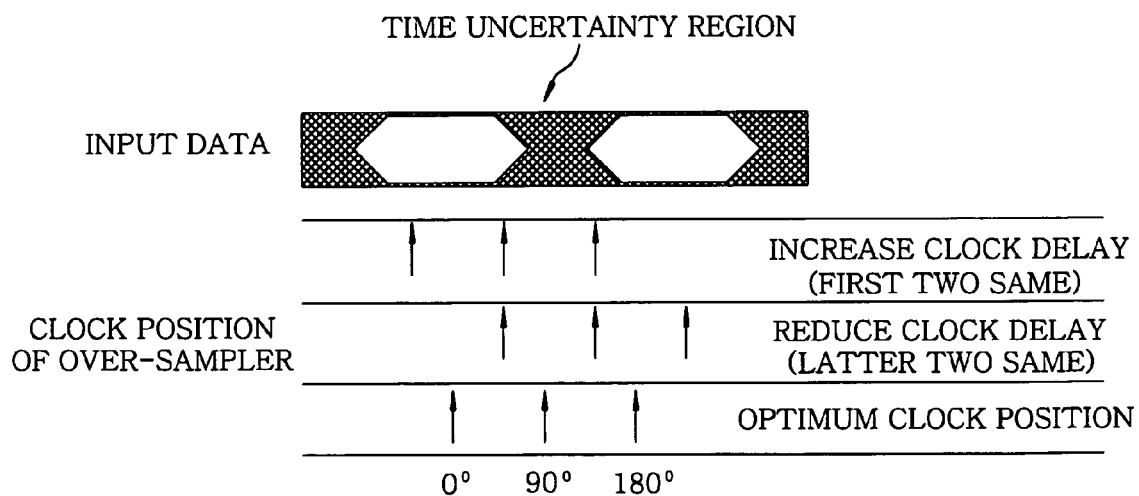
FIG. 4 offers a conventional principle of comparing a timing of a sampling clock with that of data by over-sampling.

The equalizing block 110 equalizes the external data signals and provides the equalized signals to an over-sampler 120 which takes samples of the equalized external data signals at 0, 90° and 180° phase sampling clocks provided by the clock synthesizer 130 (See FIG. 4 and clk0, clk90, clk180 in FIG. 5).

Then, the outputs of the over-sampler 120 are fed to a MUX (multiplexer) block 140 where the outputs of the over-sampler 120 are multiplexed, to thereby attain MUX decision results. The MUX decision results are decoded at a phase detector 150 to determine whether phases of the sampling clocks provided by the clock synthesizer 130 should be increased (or decreased) or not. Thus, the sampling clocks are optimally synthesized by repeating the above-described procedure. Further, the external data signal is synchronized to the sampling clocks.

Figure 6:
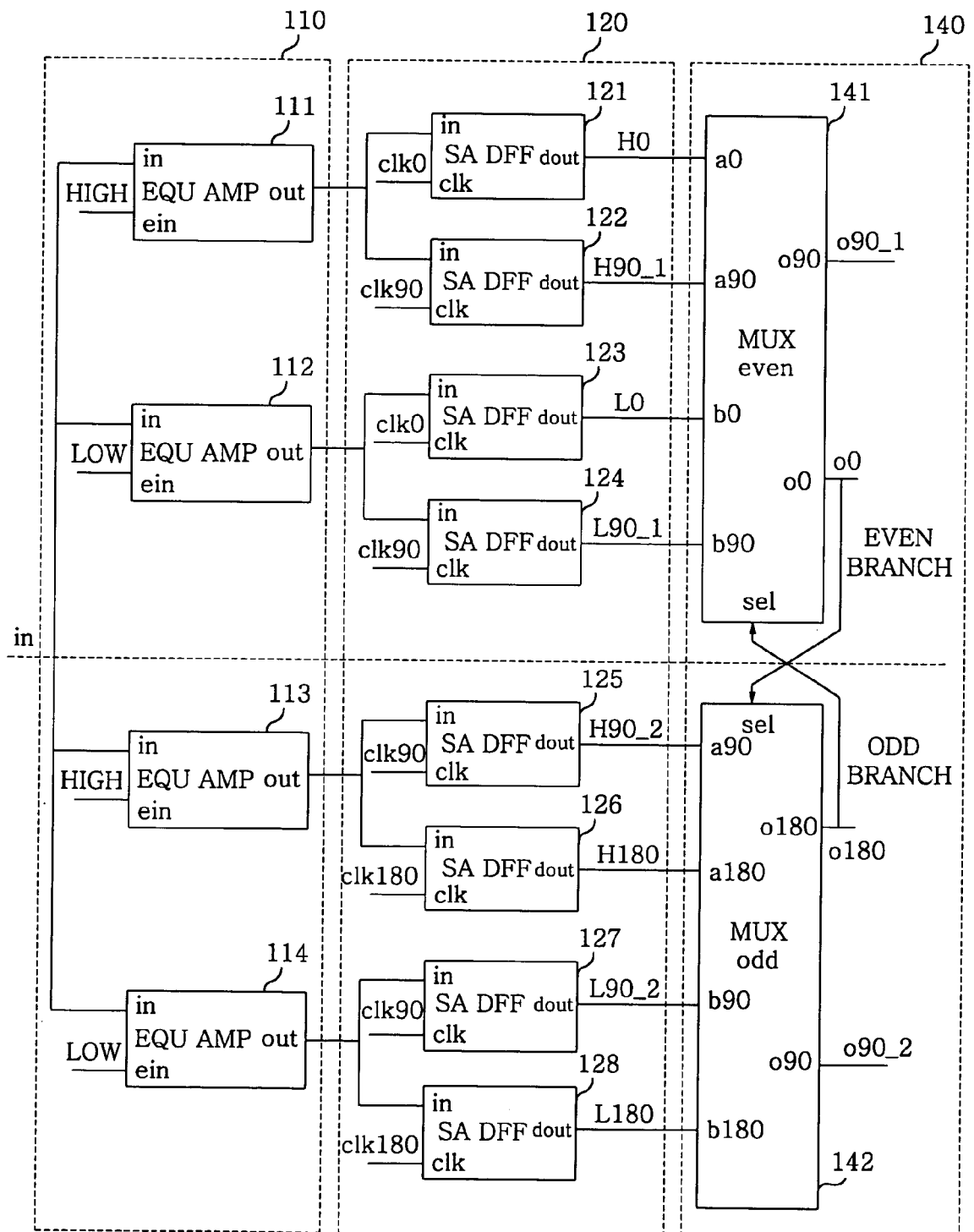
FIG. 6 presents a block diagram of an equalizing block, an over-sampler and a MUX block in accordance with the preferred embodiment of the present invention.
Figure 7:
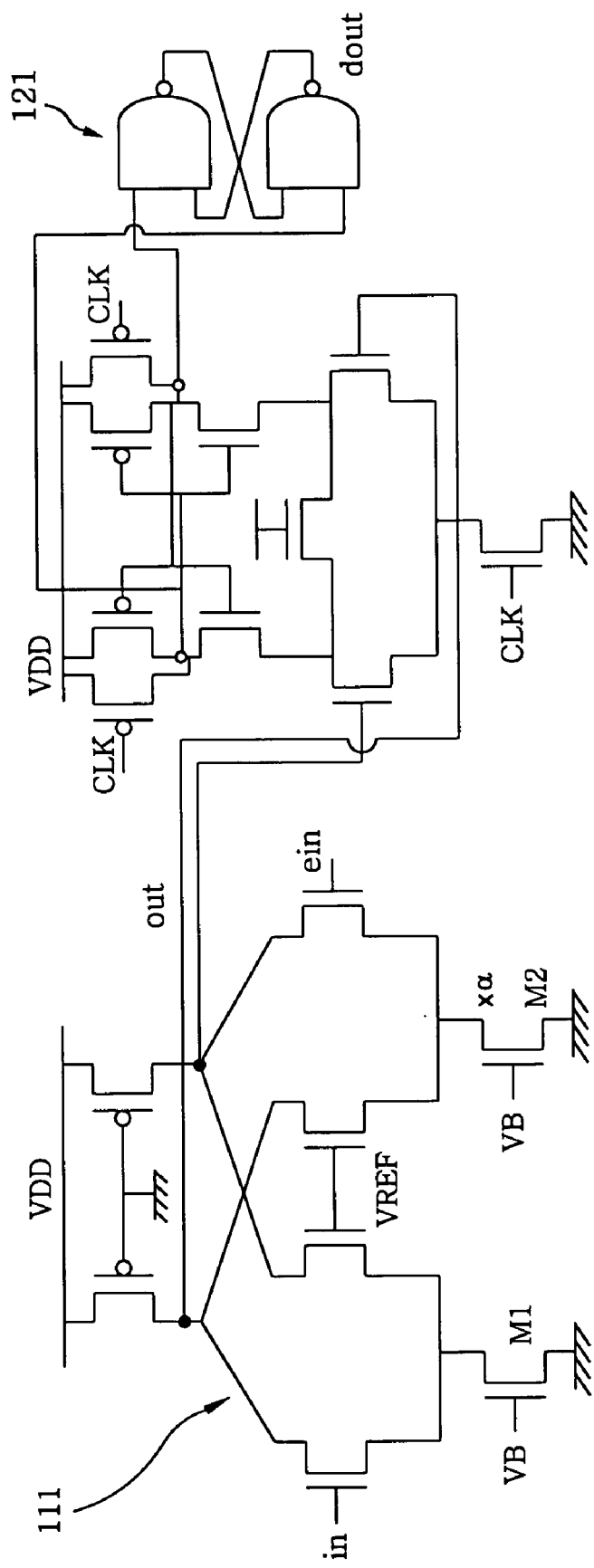
FIG. 7 depicts a circuit diagram of an equalizing amplifier and a sense amplifier D flip/flop in accordance with the preferred embodiment of the present invention.

FIG. 6 shows a block diagram showing detailed structures of the equalizing block 110 including equalizing amplifiers 111 to 114, the over-sampler 120 including sense amplifier D flip/flops 121 to 128 and the MUX block 140 including a MUX even 141 and a MUX odd 142 in accordance with the present invention. Detailed circuit diagrams of the equalizing amplifier 111 and the sense amplifier D flip/flop 121 is represented in FIG. 7, and those of the MUX even 141 and the MUX odd 142 shown in FIGS. 8A and 8B, respectively.

As shown in FIG. 6, a predetermined first input signal, i.e., a HIGH signal, is directly fed to input ports ein of equalizing amplifiers 111 and 113, and a predetermined second input signal, i.e., a LOW signal, is directly fed to input ports ein of equalizing amplifiers 112 and 114. Instead of the predetermined first and second input signals, it is also possible that the MUX decision results outputted from the MUX block 140 can be inputted to the equalizing amplifiers by feedback thereof. However, such a feedback structure causes decrease of the operational speed of the receiver. Therefore, in order to increase the speed of the receiver adopting the look-ahead decision feedback equalizing scheme in accordance with the present invention, it is preferred that the predetermined first and second input signals are used instead of feed backing the MUX decision results.

Outputs of the equalizing amplifiers 111 and 112 in an even branch are sampled at the 0° and the 90° phase sampling clocks by the sense amplifier D flip/flops 121 to 124, and outputs of the equalizing amplifiers 113 and 114 in an odd branch are sampled at the 90° and the 180° phase sampling clocks by the sense amplifier D flip/flops 125 to 128. Since, the outputs of the equalizing amplifiers are sampled at two sampling clocks for each of the branches, such a sampling operation is referred to as the 2× over-sampling. Among the outputs of the sense amplifier D flip/flops, H0 and L0 are acquired by sampling at the 0° phase sampling clock, H90_1, L90_1, H90_2, L90_2 at the 90° phase sampling clock, and H180 and L180 at the 180° phase sampling clock. First characters H and L in the name of the outputs of the sense amplifier D flip/flops indicate that the corresponding outputs are acquired in case the High signal and the Low signal are fed to the input ports ein of the equalizing amplifiers 111 to 114, respectively. Among these 8 outputs of the over-sampler 120, 4 outputs, which are going to be fed to the phase detector 150, are chosen in the MUX block 140.

The multiplexing operation of the MUX even 141 is performed in accordance with a signal o180, which is one of output signals of the MUX odd 142. That is, if the signal o180 is High, H0 and H90_1 are chosen, and otherwise, L0 and L90_1 are chosen. Further, the multiplexing operation of the MUX odd 142 is executed in accordance with a signal o0, which is one of output signals of the MUX even 141. That is, if the signal o0 is High, H90_2 and H180 are chosen, and otherwise, L90_2 and L180 are chosen. The outputs o0, o90_1, o90_2, o180 of the MUX block 140, which are called as the MUX decision results, are fed to the phase detector 150. Further, as described above, the outputs o180 and o0 are also fed to select input ports (sels) of the MUX even 141 and the MUX odd 142, respectively.

Figure 8A:
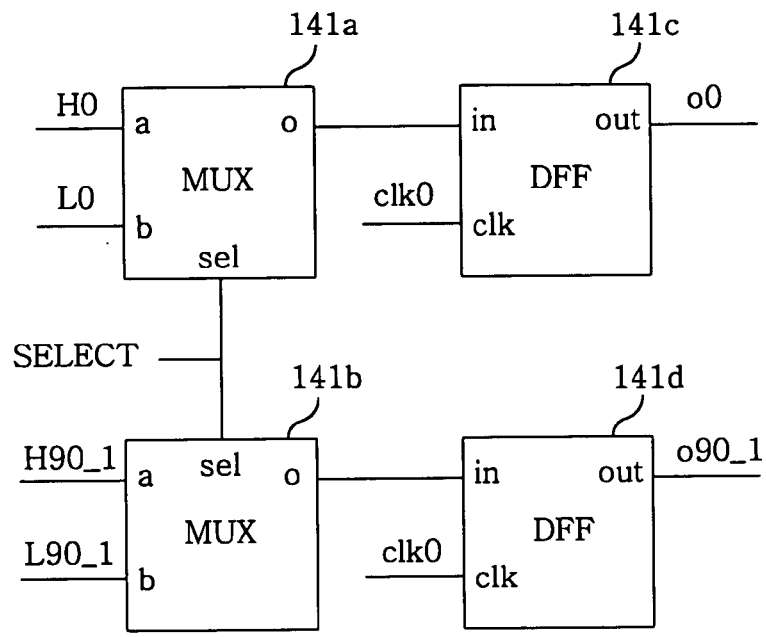
FIGS. 8A and 8B represent circuit diagrams of a MUX even and a MUX odd, respectively, in accordance with the preferred embodiment of the present invention.
Figure 8B:
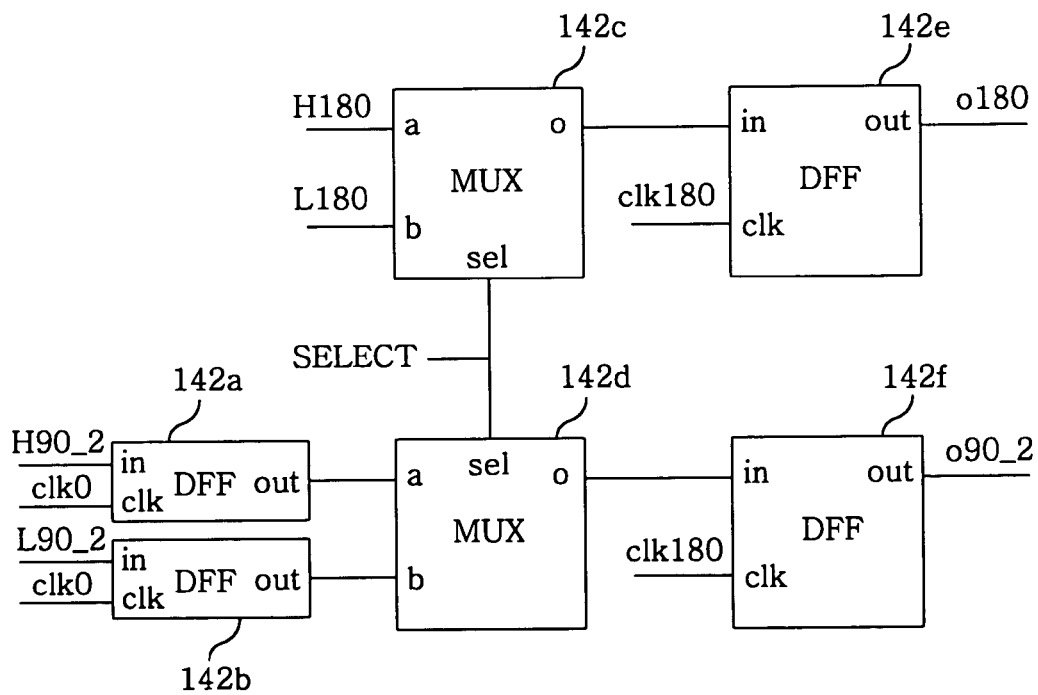

The internal structures of the MUX even 141 and the MUX odd 142 are shown in FIGS. 8A and 8B, respectively.

Referring to FIG. 8A, if a HIGH signal is fed to the select input port (sel) of the MUX even 141, a MUX 141a selects H0 among a first group including H0 and L0, and a MUX 141b selects H90_1 among a second group including H90_1 and L90_1. Otherwise, the MUX 141a selects L0 among the first group, and the MUX 141b selects L90_1 among the second group. The signal selected from the first group and the signal selected from the second group are, respectively, sampled at D flip/flops 141c, 141d, which are synchronized with clk0, and then the sampled signals o0 and o90_1 are fed to the phase detector 150.

Meanwhile, referring to FIG. 8B, in the first place, H90_2 and L90_2 are, respectively, sampled at D flip/flops 142a and 142b, which are synchronized with clk0, and then fed to a MUX 142d, and H180 and L180 are fed to a MUX 142c, directly. And if a HIGH signal is fed to the select input port (sel) of the MUX odd 142, the MUX 142c selects H180 among a third group including H180 and L180, and the MUX 142d selects the sampled H90_2 among a fourth group including the sampled H90_2 and the sampled L90_2. Otherwise, the MUX 142c selects L180 among the third group, and the MUX 142d selects the sampled L90_2 among the fourth group. The signal selected from the third group and the signal selected from the fourth group are, respectively, sampled at D flip/flops 142e, 142f, which are synchronized with clk180, and then the sampled signals o180 and o90_2 are fed to the phase detector 150.

The outputs o0, o90_1, o90_2, o180 of the MUX block 140 are fed to the phase detector 150, which outputs an up-signal (UP) or a down-signal (DOWN) in response to the outputs o0, o90_1, o90_2, o180 of the MUX block 140 as shown in table 1. That is, clock delay is adjusted in accordance with the outputs of the MUX block 140 as shown in table 1. Thereafter, the up-signal and the down-signal are fed to the clock synthesizer 130 to thereby adjust a clock delay.

By repeating the above-mentioned procedure, the circuit of FIG. 5 acquires the optimal sampling clock for sampling the external data signal, so that a high-speed equalizing receiving operation can be achieved.

TABLE 1

| o0, o90_1, o90_2, o180 (The outputs of the MUX block 140) | Clock Delay Adjustment |
|---|---|
| 1100 or 0011 | Fixed (delay is fixed) |
| 1110 or 0001 | Up (delay is increased) |
| 1000 or 0111 | Down (delay is reduced) |

In accordance with the preferred embodiment of the present invention, the structure of the equalizing block 110 is divided into two branches, i.e., the even branch and the odd branch, and each of the branches is further diverged, each diverged portion corresponding to one of the predetermined first and second input signals (HIGH, L0W), so that a plurality of the equalizing amplifiers 111 to 114 are required, as shown in FIG. 6.

However, that is, not only since the purpose of diverging each branch is only for alleviating the effect of noise and the like at a front end of the circuit of FIG. 6, but also since the outputs of the equalizing amplifiers 111 and 113 are same and the outputs of the equalizing amplifiers 112 and 114 are also same, only the equalizing amplifiers 111 and 112 or only the equalizing amplifiers 113 and 114 may be required. In this case, the output port of the equalizing amplifier 111 or 113 is fed to the over-samplers 121 and 122 in the even branch and the over-samplers 125 and 126 in the odd branch, and the output port of the equalizing amplifier 112 or 114 is fed to the over-samplers 123 and 124 in the even branch and the over-samplers 127 and 128 in the odd branch.

While the invention has been shown and described with respect to the preferred embodiments, it will be understood by those skilled in the art that various changes and modifications may be made without departing from the spirit and the scope of the invention as defined in the following claims.

What is claimed is:

1. A look-ahead decision feedback equalizing receiver comprising:

an equalizing block for amplifying a high-frequency component of an external data signal fed thereto in response to a predetermined first input signal and a predetermined second input signal, to provide a first equalized external data signal and a second equalized external data signal, respectively;

a clock synthesizer for outputting a plurality of sampling clocks, a timing thereof being adjusted by receiving an external clock synchronized with the external data signal;

an over-sampler for over-sampling the first equalized external data signal and the second equalized external data signal in synchronization with the sampling clocks;

a MUX block for multiplexing the outputs of the over-sampler in response to preceding outputs of the MUX block, which serve as select signals for the MUX block, to thereby attain MUX decision results; and a phase detector for deciding the timing of the sampling clocks by analyzing the MUX decision results.

2. The look-ahead decision feedback equalizing receiver of claim 1, wherein the equalizing block includes:

a first equalizing amplifier, to which the predetermined first input signal is fed, for providing the first equalized external data signal; and a second equalizing amplifier, to which the predetermined second input signal is fed, for providing the second equalized external data signal;

and the over-sampler includes:

an over-sampler even and an over-sampler odd, to which both the first equalized external data signal and the second equalized external data signal are fed, respectively.

3. The look-ahead decision feedback equalizing receiver of claim 1, wherein the equalizing block includes:

an equalizing block even and an equalizing block odd, the equalizing block even having a first equalizing amplifier, to which the predetermined first input signal is fed, for providing the first equalized external data signal and a second equalizing amplifier, to which the predetermined second input signal is fed, for providing the second equalized external data signal, and the equalizing block odd having a third equalizing amplifier, to which the predetermined first input signal is fed, for providing the first equalized external data signal and a fourth equalizing amplifier, to which the predetermined second input signal is fed, for providing the second equalized external data signal;

and the over-sampler includes:

an over-sampler even to which the outputs of the first and the second equalizing amplifier are fed; and an over-sampler odd to which the outputs of the third and the fourth equalizing amplifier are fed.

4. The look-ahead decision feedback equalizing receiver of claim 2, wherein the over-sampler even over-samples the first equalized external data signal and the second equalized external data signal in synchronization with a 0° and a 90° phase sampling clocks, and the over-sampler odd over-samples the first equalized external data signal and the second equalized external data signal in synchronization with the 90° and a 180° phase sampling clocks.

5. The look-ahead decision feedback equalizing receiver of claim 3, wherein the over-sampler even over-samples the outputs of the first and the second equalizing amplifiers in synchronization with a 0° and a 90° phase sampling clocks, and the over-sampler odd over-samples the outputs of the third and the fourth equalizing amplifiers in synchronization with the 90° and a 180° phase sampling clocks.

6. The look-ahead decision feedback equalizing receiver of claim 4, wherein the MUX block includes:

a MUX even for multiplexing the outputs of the over-sampler even in accordance with a first select signal from the MUX odd to thereby select first MUX decision results among the outputs of the over-sampler even; and a MUX odd for multiplexing the outputs of the over-sampler odd in accordance with a second select signal from the MUX even to thereby select second MUX decision results among the outputs of the over-sampler odd.

7. The look-ahead decision feedback equalizing receiver of claim 5, wherein the MUX block includes:

a MUX even for multiplexing the outputs of the over-sampler even in accordance with a first select signal from the MUX odd to thereby select first MUX decision results among the outputs of the over-sampler even; and a MUX odd for multiplexing the outputs of the over-sampler odd in accordance with a second select signal from the MUX even to thereby select second MUX decision results among the outputs of the over-sampler odd.

8. The look-ahead decision feedback equalizing receiver of claim 6, wherein the phase detector increases, decreases or fixes a delay in the timing of the sampling clock in accordance with the first and the second MUX decision results.

9. The look-ahead decision feedback equalizing receiver of claim 7, wherein the phase detector increases, decreases or fixes a delay in the timing of the sampling clock in accordance with the first and the second MUX decision results.

* * * * *